United States Patent [19]

Underwood

[11] Patent Number: 4,911,840

[45] Date of Patent: Mar. 27, 1990

[54] WATER CONDITIONING APPARATUS

[75] Inventor: David T. Underwood, Richardson, Tex.

[73] Assignee: Ametek, Inc., Plymouth Products Division, Sheboygan, Wis.

[21] Appl. No.: 278,038

[22] Filed: Nov. 30, 1988

[51] Int. Cl.$^4$ .............................................. B01D 13/00
[52] U.S. Cl. ............................... 210/321.83; 210/437; 210/449; 210/450; 210/451
[58] Field of Search .................... 210/321.74, 321.83, 210/321.85, 321.87, 449, 450, 451, 317, 494.1, 437

[56] References Cited

U.S. PATENT DOCUMENTS

| | | | |
|---|---|---|---|
| 3,206,216 | 9/1965 | Crook | 210/450 |
| 3,295,684 | 1/1967 | Webb | 210/450 |
| 3,504,796 | 4/1970 | Bray | 210/137 |
| 3,542,199 | 11/1970 | Bray et al. | 210/134 |
| 3,695,446 | 10/1972 | Lyall et al. | 210/321.83 |
| 3,707,236 | 12/1972 | Takebayasi | 210/449 |
| 3,828,527 | 8/1974 | Briggs et al. | 210/450 |
| 3,847,819 | 11/1974 | Firth | 210/451 |
| 4,218,317 | 8/1980 | Kirschmann | 210/449 |
| 4,235,722 | 11/1980 | Sakaguchi | 210/450 |
| 4,461,707 | 7/1984 | Thayer et al. | 210/450 |
| 4,473,471 | 9/1984 | Robichaud et al. | 210/450 |
| 4,609,463 | 9/1986 | Macevicz et al. | 210/321.83 |
| 4,744,900 | 5/1988 | Bratt | 210/321.87 |

Primary Examiner—Richard V. Fisher
Assistant Examiner—Cynthia L. Nessler
Attorney, Agent, or Firm—Andrus, Sceales, Starke & Sawall

[57] ABSTRACT

A portable water treatment apparatus utilizing a cylindrical filter module having a spirally wound semipermeable membrane assembly includes interior upper and lower O-ring seals and an outer brine seal, all of which may be assembled without any potentially damaging movement between the seals and the respective interfacing surfaces in contact with the seals. Each of the O-ring seals is disposed between an annular shoulder on one interfacing part and a frustoconical surface on the other part such that a sealing compression is the only movement imposed on the O-ring. The brine seal, comprising a strip of adhesive-coated tape, is attached after the filter module has been placed in the housing such that it is in its final sealing position and is undisturbed by any subsequent assembly step.

12 Claims, 1 Drawing Sheet

WATER CONDITIONING APPARATUS

BACKGROUND OF THE INVENTION

The present invention relates to a water conditioning apparatus for filtering certain undesirable materials from drinking water and, more particularly, to a small portable unit adapted to treat tap water by utilizing a semipermeable membrane to remove dissolved minerals.

The removal of dissolved minerals from water by reverse osmosis utilizing semipermeable membrane technology is well known in the art. Many types of undesirable dissolved solids which contribute to unpleasant taste, odor, hardness or the like may be selectively removed and retained on a semipermeable membrane through which the filtered water containing the remaining unobjectionable dissolved solids is caused to flow under pressure.

Apparatus of various types utilizing reverse osmosis to provide filtered water for home consumption are shown in the prior art. Typically, these filter units are adapted to be attached to a conventional household faucet to filter objectionable dissolved solids from tap water. One common construction utilizes a semipermeable membrane module in which a multiple layer member comprising a semipermeable membrane sheet between layers of a porous fabric and a plastic screen is spirally wound around a rigid, hollow cylindrical plastic tube. The module is appropriately sealed within a housing and unpurified water is forced to flow under pressure in an axial direction through the module where system pressure forces purified water radially through the membrane layers while retaining the selectively objectionable dissolved solids. The filtered purified water travels spirally toward the central product water tube which is provided with a series of radial holes allowing the filtered water to be collected in the center of the module for discharge from the unit. The retained dissolved solids pass axially through the module in a concentrated brine which is discharged to a drain or the like.

The construction of a multi-layer, spirally wound reverse osmosis module is described in detail in U.S. Pat. No. 3,504,796 (Bray). Reverse osmosis water treatment units utilizing a similar type of spirally wound filter module are also shown in U.S. Pat. Nos. 3,542,199 (Bray et al), 3,695,446 (Lyall et al), and 4,609,463 (Macevicz et al).

Many prior art filter units of the type described above are constructed in a manner to allow the filter module to be periodically removed and replaced. Because these filter units typically operate at relatively high pressures, appropriate sealing becomes critically important. The provision and maintenance of adequate seals has been a problem in some prior art devices, particularly those constructed with replaceable filter modules. In a typical construction, the water purification device must be sealed internally to assure that the unfiltered influent is forced under system pressure to pass through the multi-layer, spirally wound filter member and does not short circuit such passage by leaking past the interface between the interior product water tube and the upper and lower ends of the housing or the interface between the outer surface of the spirally wound filter member and the cylindrical inside surface of the housing. It is also important that the removable cover, providing access to the interior of the housing for filter module replacement, include an appropriate seal at its attachment interface with the housing.

The seal between the center product water tube and the lower and upper ends of the housing (the upper end typically comprising the inside surface of a removable cover) may utilize conventional O-rings placed in suitable circumferential grooves in one of the interfacing parts. Apart from the semipermeable membrane, most of the components of a filter unit are molded from plastic and, in accordance with conventional molding technology, many parts are formed with a longitudinal part line formed by the seam where the conventional mold halves join. The part line produces a small plastic ridge and, if the part line passes through a groove or other surface on which an O-ring is seated, small leaks past the O-ring may occur in service. Leaking may be further aggravated if the O-rings are periodically moved or otherwise disturbed as a result of removal of the filter module for replacement. To avoid this problem, some constructions utilize multiple O-ring seals at each component interface.

The so-called "brine seal" between the cylindrical OD of the filter module and the complimentary ID of the housing, as indicated, generally comprises a band of flexible sealing material attached to the OD of the filter module and compressed into engagement with the cylindrical ID of the housing when the filter module is installed therein. The band of flexible material may comprise an adhesive-backed plastic tape which is wrapped around the filter module. However, because of tee relatively fragile nature of the spirally-wound membrane assembly, it can be crushed or otherwise damaged by wrapping the brine seal tape too tightly. Another type of brine seal consists of a flexible rubber boot having a generally conical cross section which is wrapped around the filter module and includes an integral annular flange which extends radially toward the inside surface of the housing and axially in the direction of high system pressure. In operation, system pressure tends to force the annular flange into engagement with the inside surface of the housing, thereby enhancing the seal. However, the effective use of such a seal requires the accurate formation of interfacing components and fairly high dimensional tolerances. Defective or out of tolerance parts can result in leaking and the loss of the brine seal. Another problem common to all brine seals of the type shown in the prior art is that relative movement between the surfaces to be sealed as the filter module is inserted in the housing may distort or damage the sealing member. If the integrity of the seal is lost, it may not become apparent until the filter unit is closed and tested or put into service. In addition, anytime an untrained consumer must replace his own filter module, the problem of improper installation and subsequent loss of seal and leakage is more likely.

SUMMARY OF THE INVENTION

In accordance with the present invention, there is provided a reverse osmosis water treatment apparatus with improved constructions for both the O-ring seals on the interior of the filter module and the brine seal on the exterior thereof. The improved O-ring seal and the improved brine seal both provide seals with inherently enhanced sealing capability, as well as improved immunity against distortion and damage during assembly.

The apparatus of the present invention utilizes a conventional semipermeable membrane assembly spirally wound around an interior cylindrical water tube. The opposite ends of the product water tube and the interfacing surfaces of the lower and upper housing members are provided with uniquely shaped and oriented surface means between which O-ring seals may be disposed in a manner which precludes relative sliding movement during assembly between the surface on one interfacing part and the O-ring on the surface of the other part.

In a preferred embodiment, the closed interior end of the lower housing member and the interior of the cover on the upper housing member are each provided with an integral annular shoulder adapted to sat a conventional O-ring. Each end of the product water tube on the interior of the filter module is provided with an annular chamfer defining a frustoconical surface adapted to engage the lower and upper O-rings upon insertion of the filter module into the lower housing member and attachment of the upper housing member thereto, respectively.

The improved brine seal of the present invention, likewise, is effected after the filter module is essentially in place within the lower housing member. As a result, there is no relative sliding movement between the brine seal and one of the interfacing surfaces during installation. The integrity of the brine seal is thus better assured in the final assembly.

The improved brine seal is effected by providing the upper end of the lower housing member with an integral annular flange disposed to surround the cylindrical membrane assembly as the filter module is inserted into the lower housing. A sealing strip is placed around the annular flange and the membrane assembly along the junction therebetween and secured to the outer surfaces of the flange and membrane assembly. Preferably, the sealing strip comprises an adhesive coated plastic tape. The brine seal is undisturbed by the subsequent attachment of the upper housing member and cover to the lower housing member to close and seal the unit.

In the preferred embodiment, the entire filter unit is made to be completely disposable. Thus, the upper housing member is attached to the lower housing member by a continuous, permanent water tight seal, preferably by solvent bonding. The problem of leakage past external demountable cover seals is therefore eliminated. In addition, by permanently sealing the unit, the problem of interior seal damage as a result of opening the unit, as for filter module replacement, is obviated.

DETAILED DESCRIPTION OF THE PREFERRED EMBODIMENT

Figure 1:
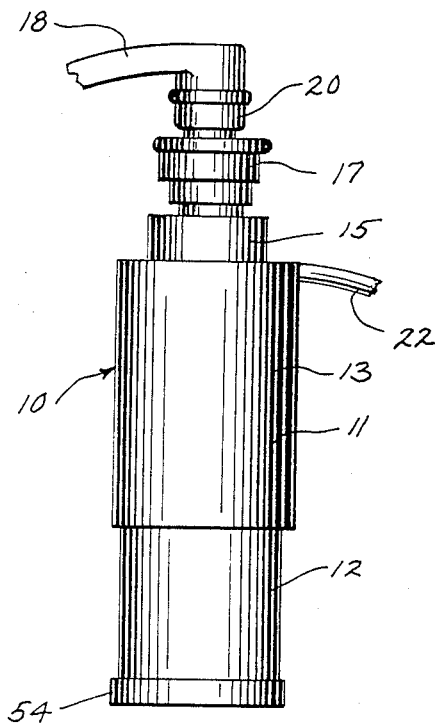
FIG. 1 is a side elevation of the water treatment apparatus of the present invention shown with its demountable attachment to a conventional household water faucet.

The water treatment apparatus 10 of the present invention includes an outer housing 11 comprising a lower housing member 12 and an upper housing member 13. The lower housing member 12 includes a closed lower end 14 and the upper housing member 13 includes a cover portion 15.

The cover portion 15 includes an inlet opening 16 which is threaded for receipt of a quick disconnect mounting 17 for attachment to a conventional faucet 18. The faucet 18 may be provided with a suitable adapter 20 to accommodate the quick disconnect mounting 17. The upper housing member 13 also includes a treated water outlet 21 to which a suitable outlet tube 22 may be attached.

Figure 2:
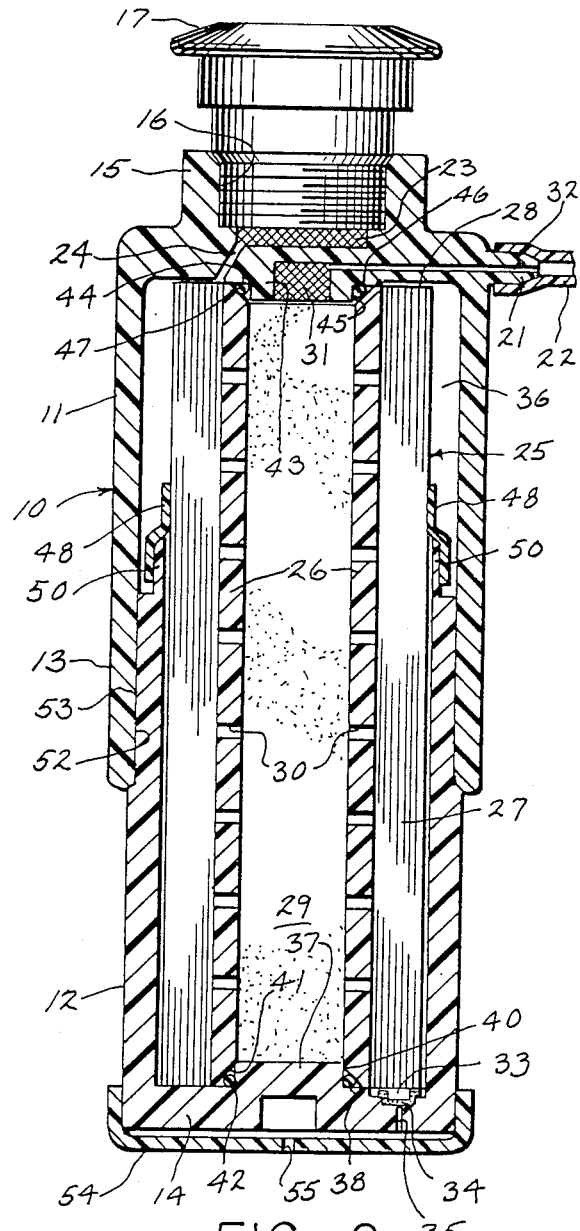
FIG. 2 is a vertical section through the apparatus shown in FIG. 1.
Figure 3:
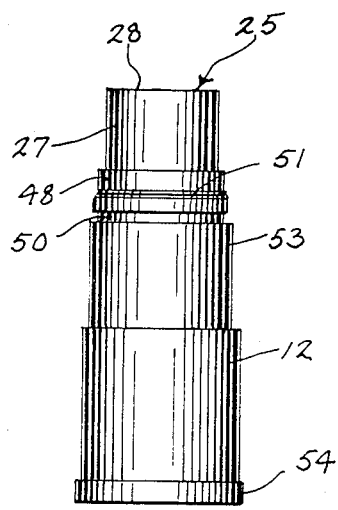
FIG. 3 is a side elevation of the apparatus with the upper housing member removed to show the installed brine seal.

Referring particularly to FIG. 2, tap water from the faucet 18 enters the apparatus through the inlet opening 16 from which it flows through a prefilter 23 and narrow feed water passage 24 to the interior of the upper housing member 13. The prefilter 23 may comprise a disc of molded porous polypropylene having a pore size in the range of 75–250 microns, depending on overall water quality.

A reverse osmosis filter module 25 is disposed within the housing 11 and extends between the closed lower end 14 an the cover portion 15. The filter module 25 includes an inner hollow cylindrical product water tube 26 around the outside of which is disposed a spirally-wound semipermeable membrane assembly 27. The filter module is of a conventional construction and includes the spirally wound membrane assembly of the type briefly described above and in more detail in the above identified patents. Water to be treated which enters the housing via the feed water passage 24 is forced under system pressure into the upper end 28 of the membrane assembly 27, where upon it moves downwardly through the assembly and laterally through the semipermeable membrane layers which reject the undesirable dissolved solids. Purified water passing through the semipermeable membrane travels in a spiral path through the porous separator between the membrane layers until it reaches the product water tube 26. The product water tube is provided with a series of openings 30 through which the filtered water may pass to the interior of the unit. From the interior of the product water tube 26, the filtered water travels upwardly through a small pore filter member 31 to a treated water passage 32 leading to the treated water outlet 21. The interior of the product water tube may be filled with a supplemental treatment material 29, such as granular activated carbon, to further retain dissolved matter passing through the semipermeable membrane and to improve the odor, taste or otherwise improve the quality of the final product water.

The undesirable dissolved materials which do not pass through the semipermeable membrane in the membrane assembly 27 are retained in a concentrated brine solution which passes downwardly through the membrane assembly to a brine sump 33 in the lower end 14 of the housing. From the sump 33, the brine passes through a small stainless steel filter screen 34 and is discharged from the unit via a small diameter brine opening 35 in the lower end 14.

The untreated water entering the upper interior portion 36 of the housing via the feed water passage 24 is at relatively high pressure sufficient to force it into the upper end 28 of the membrane assembly 27, downwardly therethrough, and radially through the semipermeable membrane layers. Sealing means must, therefore, be provided to prevent untreated water from bypassing the filter module 25 along any of the regions where the module interfaces with the housing members 12 and 13. Thus, untreated water must be prevented from moving downwardly between the outside of the membrane assembly 27 and the inside of the lower housing member 12 directly to the brine sump 33. Also, the untreated water entering the unit must be prevented from bypassing the upper end of the filter module 25 and passing directly into the interior of the product water tube 26. Finally, the brine sump 33 at the lower end of the filter module must be sealed from the interior of the product water tube to prevent contamination of the filtered product water by the brine solution and to ensure a pressure adequate to discharge the brine solution from the brine outlet 35.

The interior of the closed lower end 14 of the lower housing member is provided with a circular boss 37 which defines an annular shoulder 38. The diameter of the cylindrical face 40 of the annular shoulder 38 is preferably just slightly smaller than the inside diameter of the product water tube 26. The lower end of the product water tube is chamfered to define a lower frustoconical surface 41 directly adjacent the annular shoulder 38. A lower O-ring 42 is placed around the annular shoulder and is engaged by the lower frustoconical surface 41 as the filter module 25 is inserted into the lower housing member 12 on assembly of the unit.

Similarly, the interior of the cover portion 15 of the upper housing member 13 includes a circular boss 43 surrounding the filter member 31 and defining an annular shoulder 44. The cylindrical face 45 of the shoulder 44 is of the same diameter as the cylindrical face 40 on the lower shoulder 38 and, similarly, just slightly smaller than the inside diameter of the product water tube 26. As with the lower end, the upper end of the product water tube is chamfered to define an upper frustoconical surface 46 facing the annular shoulder 44. An upper O-ring 47 is placed on the annular shoulder 44 and sealingly engages the upper frustoconical surface 46 as the upper housing member is placed over the filter module and attached to the lower housing member. Of course, this action simultaneously results in similar sealing engagement of the lower O-ring 42 and the surfaces of the annular shoulder 38 and the lower frustoconical surface 41 between which it is disposed.

A brine seal 48 is provided to seal the passage between the outer cylindrical surface of the membrane assembly 27 and the inner cylindrical surface of the lower housing member 12 to seal the upper interior portion 36 of the housing from the lower brine sump 33. The upper end of the lower housing member 12 is provided with an integral annular flange 50 having a somewhat reduced thickness and disposed closely adjacent the outer cylindrical surface of the membrane assembly 27. After the filter module is inserted into the lower housing member in the initial assembly step, the brine seal 48 preferably comprising a strip of adhesive-coated plastic tape 51 is attached around the adjacent outer surfaces of the flange 50 and membrane assembly 27. The interface between these two surfaces is thus effectively sealed.

As will be apparent from the foregoing description, there is very little relative movement between the opposed surfaces of the lower annular shoulder 38 and frustoconical surface 41 as the lower O-ring 42 is compressed therebetween during assembly. Likewise, there is very limited relative movement between the opposed surfaces of the upper annular shoulder 44 and the upper frustoconical surface 46 as the intermediate O-ring 47 is sealed therebetween when the upper housing member is attached to the lower member. There is thus little chance of unintended movement, distortion, or damage of the O-rings during assembly. In addition, the nature of the O-ring seals, which are disposed in recesses between the sealed surfaces having a generally triangular cross section, is such that system pressure actually enhances the seal by tending to force the O-ring into an acute angular corner defined by the frustoconical surface and one of the surfaces of the annular shoulder. The same type of O-ring seal could be alternately provided by forming the annular shoulders on the ends of the product water tube 26 and the frustoconical surfaces on the circular bosses 37 and 43.

The brine seal 48 is similarly not subject to any significant relative movement between the sealed surfaces during assembly and, therefore, less likely to be distorted, torn, ruptured, or otherwise damaged. The tape 51 providing the brine seal 48 provides a simple, yet very reliable, seal the integrity of which is undisturbed by subsequent steps in the assembly process. Several wraps of a 0.007 inch thick vinyl tape has been used to provide a satisfactory brine seal. Wrapping the brine seal tape simultaneously around the rigid annular flange and the surface of the membrane assembly 27 helps prevent inadvertent crushing of the latter from wrapping the tape too tightly.

The water treatment unit of the present invention is preferably permanently sealed on assembly and thus intended to be completely disposable. The downwardly depending lower end 52 of the upper housing member 13 comprises a cylindrical skirt which is dimensioned to fit snugly over the upper end 53 of the lower unit just below the annular flange 50. The abutting surfaces of the overlapping ends 52 and 53 are preferably solvent bonded to provide a continuous and permanently sealed joint therebetween. The housing components are molded of a suitable plastic which is amenable to solvent bonding utilizing well known techniques. The permanently sealed one-piece housing also eliminates another O-ring seal and thus a potential source of leaks.

When it is desired to replace the unit,, the quick disconnect mounting 17 is unthreaded and removed and attached to the replacement unit.

The discharge of the brine solution through the brine outlet 35 occurs under pressure and the formation of a fine brine mist outside the unit is known to occur. The mist-like discharge also creates some noise and, to eliminate both the airborne mist and the noise, the lower end of the housing may be enclosed with a cap 54 having a relatively large hole 55 in the bottom from which the brine may slowly drip into a sink drain or the like.

I claim:

1. In a water treatment apparatus including a generally cylindrical lower housing member having a closed lower end, an upper housing member having a cover portion and a downwardly depending cylindrical skirt adapted to be attached to the lower housing member to provide a substantially closed housing, a hollow cylindrical filter module disposed within the housing and extending between the cover and the lower end, an untreated water inlet in the housing in fluid communication with one side of the filter module, and a treated water outlet in the housing in fluid communication with the other side of the filter module, an improved sealing system for sealing the interface between the housing and the ends of the filter module comprising a pair of opposed surfaces on the housing members and each end of the filter module, one of each pair of said surfaces comprising an annular shoulder and the other of said surfaces comprising a frustoconical surface, a flexible O-ring disposed between each pair of surfaces, and means for permanently attaching the cylindrical skirt of the upper housing member to the lower housing member to impose and hold a uniform compressive sealing force on the O-rings.

2. The invention as set forth in claim 1 wherein the surfaces comprise an annular shoulder on each of the lower end of the lower housing member and the cover portion of the upper housing member, and a frustoconical surface on each end of the filter module.

3. The invention as set forth in claim 2 wherein the filter module comprises a rigid hollow cylindrical product water tube having a semipermeable membrane assembly spirally wound around the outside surface thereof.

4. The invention as set forth in claim 3 wherein said frustoconical surfaces are disposed on the ends of the product water tube.

5. The invention as set forth in claim 4 including a brine seal disposed to seal the interface between the outside surface of the filter module and the inside surface of the housing.

6. In a water treatment apparatus including a generally cylindrical lower housing member having a closed lower end, an upper housing member having a cover portion and a downwardly depending cylindrical skirt adapted to be attached to the lower housing member to provide a substantially closed housing, a hollow cylindrical filter module disposed within the housing between the cover and the lower end, said module including an inner hollow cylindrical product water tube and an outer spirally-wound semipermeable membrane assembly, an untreated water inlet in the housing in communication with one end of the membrane assembly, and a treated water outlet in the housing in communication with the interior of the product water tube, an improved brine seal for preventing the bypass of untreated water comprising:

a integral annular flange on the upper end of the lower housing member and disposed to surround the membrane assembly in closely spaced relation thereto; and a sealing strip encircling the annular flange and the membrane assembly along the juncture therebetween and attached to the outer surfaces of the flange and the membrane assembly.

7. The invention as set forth in claim 6 wherein said sealing strip comprises an adhesive-coated plastic tape.

8. The invention as set forth in claim 6 wherein the cylindrical skirt is adapted to overlie the brine seal and to be attached to the outer surface of the lower housing member below the brine seal.

9. The invention as set forth in claim 8 wherein the cylindrical skirt is attached to the lower housing member by a continuous solvent bond.

10. The invention as set forth in claim 6 including first sealing surfaces on the upper and lower ends of the product water tube and second sealing surfaces on the cover an the lower end disposed respectively adjacent and in spaced relation to said first surfaces, and a flexible annular seal between each first surface and its respectively adjacent second surface.

11. The invention as set forth in claim 10 wherein each first surface comprises a frustoconical surface and each second surface comprises an annular shoulder.

12. The invention as set forth in claim 11 wherein said annular seal comprises an O-ring.

* * * * *